United States Patent [19]
Tourtellotte et al.

[11] 3,757,521
[45] Sept. 11, 1973

[54] INTEGRATED ENGINE EXHAUST EMISSION CONTROL SYSTEM

[75] Inventors: John F. Tourtellotte, Westfield; John S. Negra, Plainfield; Abe Warshaw, Matawan; John F. Villiers-Fisher, Kendall Park, all of N.J.

[73] Assignee: Chemical Construction Corporation, New York, N.Y.

[22] Filed: Apr. 27, 1971

[21] Appl. No.: 137,830

[52] U.S. Cl. .................. 60/274, 23/288 F, 60/279, 60/284, 60/286, 60/297, 60/301, 423/213
[51] Int. Cl. ......................... F02b 75/10, F01n 3/14
[58] Field of Search .................... 60/274, 278, 279, 60/284, 286, 301, 297, 298, 299; 23/288 F, 2 E; 55/DIG. 30; 423/213

[56] References Cited
UNITED STATES PATENTS

| | | | |
|---|---|---|---|
| 3,645,098 | 2/1972 | Templin | 60/279 |
| 3,662,540 | 5/1972 | Murphey | 60/274 |
| 1,902,160 | 3/1933 | Frazer | 60/301 |
| 2,673,446 | 3/1954 | Salardi | 60/297 |
| 2,942,932 | 6/1960 | Elliott | 60/297 |
| 3,050,935 | 8/1962 | Eastwood | 60/286 |
| 3,180,712 | 4/1965 | Hamblin | 60/284 |
| 3,228,746 | 1/1966 | Howk | 60/298 |

*Primary Examiner*—Douglas Hart
*Attorney*—J. L. Chaboty

[57] ABSTRACT

An integrated method for controlling and preventing the emission of noxious components in engine exhaust during all the various phases of the engine operating cycle, such as startup, normal operation, overload, and when the engine exhaust gas is at an abnormally elevated temperature.

20 Claims, 1 Drawing Figure

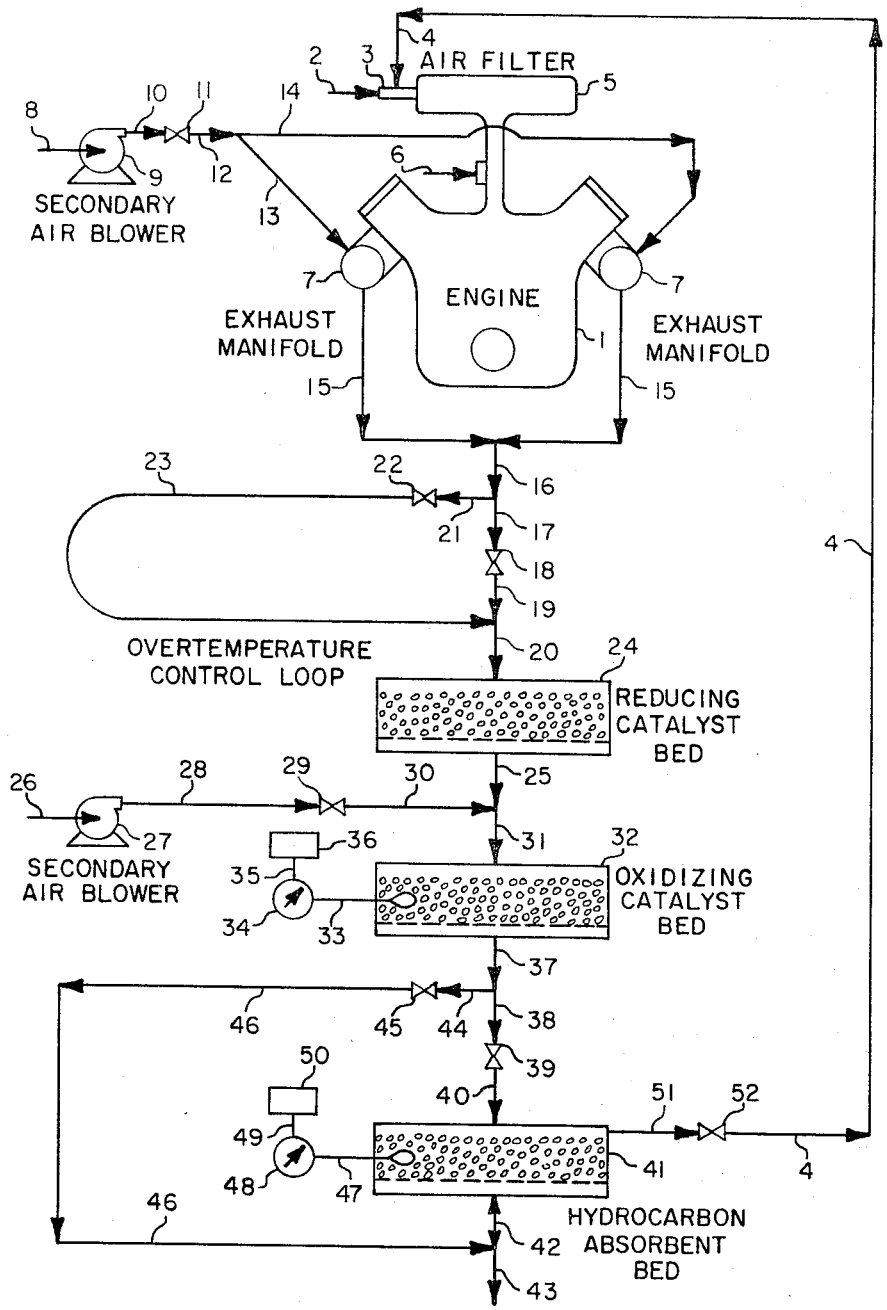

INTEGRATED ENGINE EXHAUST EMISSION CONTROL SYSTEM

BACKGROUND OF THE INVENTION

1. Field of the Invention

The invention relates to the prevention of air pollution due to the emission of unburned or thermally degraded hydrocarbons, nitrogen oxides and carbon monoxide in the exhaust gas discharged by engines, such as internal combustion engines as provided for automobiles, trucks, buses or the like. In recent years it has been recognized that the exhaust gas discharged from internal combustion engines is a serious source of air pollution, especially in metropolitan areas. In some areas a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas after initial catalytic reduction of nitrogen oxides, followed by catalytic oxidation of residual hydrocarbons, carbon monoxide, etc., in various types of apparatus or catalytic mufflers especially designed for this purpose.

The invention relates particularly to catalytic exhaust gas treatment systems in which air is added to the exhaust gas, and the resulting mixture is passed through a catalyst bed or beds to catalytically oxidize noxious unburned or thermally degraded hydrocarbon vapors or other organic vapors, and carbon monoxide, to innocuous products such as carbon dioxide and water vapor. The term hydrocarbons will be understood to encompass and include residual unburned hydrocarbons, thermally degraded hydrocarbons and other organic vapors in the exhaust gas stream. The invention also relates to systems in which the exhaust gas is initally passed through a reducing catalyst bed to selectively reduce nitrogen oxides to nitrogen by catalytic reaction with carbon monoxide, hydrogen and/or hydrocarbons, which may be initially present in the exhaust gas.

The catalytic reduction-oxidation procedure, during steady state operation with a hot engine and hot exhaust gas, results in the elimination of these deleterious components initially present in the exhaust gas from external or internal combustion engines such as jet engines, gas turbines, diesel engines, and gasoline-burning automobile, bus and truck engines, so as to prevent the discharge into the atmosphere of these noxious components including unburned hydrocarbons, other organic vapors, carbon monoxide and nitrogen oxides, and thereby prevent air pollution.

2. Description of the Prior Art

Numerous catalysts, catalytic devices and mufflers, and treatment systems have been proposed for the processing of exhaust gas emitted by engines, so as to control engine exhaust emissions and prevent the discharge of noxious components into the atmosphere. Among the many patents relating to catalysis and catalytic formulations may be mentioned U.S. Pats. Nos. 3,053,773; 3,429,656; 3,316,057; 3,398,101; 3,477,893 and 3,476,508, and U.S. Patent Application Nos. 55,998 filed July 17, 1970 and 45,576 filed June 11, 1970 now U.S. Pat. No. 3,701,822. Apparatus for carrying out the procedure are described in U.S. Pats. Nos. 3,380,810; 3,325,256; 3,255,123; 3,222,140; 3,186,806; 3,180,712; 3,169,836; 3,168,806; 3,146,073 and 3,086,839 and U.S. Patent Application No. 33,359 filed Apr. 30, 1970, now U.S. Pat. No. 3,656,915, which describes a two-stage apparatus for carrying out the process with interstage air injection.

SUMMARY OF THE INVENTION

In summary, the method of the present invention entails the control of engine exhaust emissions in a system in which the initial exhaust gas stream emitted by the engine contains noxious impurities including nitrogen oxides, hydrocarbons and carbon monoxide, and the initial exhaust gas stream is passed through a reducing catalyst bed and an oxidized catalyst bed, with secondary air injection prior to the oxidizing catalyst bed. Four time periods or cycles are contemplated in the preferred embodiment of the invention as described in detail infra.

In the first time period starting with engine startup and extending for up to 10 minutes, the initial exhaust gas is at a temperature below 250° C and contains an abnormally high concentration of hydrocarbons. Secondary air is injected prior to the reducing catalyst bed and the catalytically treated exhaust gas is passed through a hydrocarbon absorbent bed.

In the second time period, the engine is operated normally and exhaust gas is produced at 250° to 700° C. The secondary air injection prior to the reducing catalyst bed is reduced or terminated, so that free oxygen content of the exhaust gas at entry into the reducing catalyst bed is less than about 30 percent in excess of the stoichiometric requirement to oxidize carbon monoxide in the exhaust gas, and additional secondary air is injected between the reducing and the oxidizing catalyst beds. In addition, a portion of the hot exhaust gas discharged from the oxidizing catalyst bed is recycled through the hydrocarbon absorbent bed to desorb hydrocarbons, and the resulting gaseous mixture is recycled to the engine.

During a third time period of engine overload, in which the initial exhaust gas temperature is in the range of 700° to 1,000° C, the initial exhaust gas stream is cooled prior to the reducing catalyst bed by indirect heat exchange with the surrounding atmosphere, by passing the exhaust gas stream through an overtemperature control loop or other means adapted to receive and cool exhaust gas. Other operating conditions and flow sequences during the third time period remain as provided in the second time period.

During a fourth time period of severe engine overload, in which the exhaust gas is generated at a temperature in excess of 1,000° C, all secondary air flow is terminated, and the flow of recycle exhaust gas through the absorbent bed is also terminated.

The invention, in a preferred embodiment, consists of a complete control system to reduce the emissions in the exhaust of internal combustion engines, and other fuel burning equipment. The invention specifically reduces the emissions of oxides of nitrogen, hydrocarbons and carbon monoxide. The invention converts these obnoxious gases to harmless nitrogen gas, water vapor and carbon dioxide gases. The Federal Government of the United States has set standards relating to the emissions from automobiles and to the methods of analyging these emissions. In addition to reducing the emissions to low levels, it is necessary for the system to begin operation immediately upon starting the engine. Catalytic systems are capable of obtaining these low levels of emissions, but must be hot before they operate efficiently. The present invention solves the problem by the development of hardware and a control system to warm the system to operating temperatures in a short time; hardware and control system to capture unburned hydrocarbons early in the cycle; a cooling system to prevent overtemperature damage to the hardware, catalyst and control components; and the hardware and control system to recycle the unburned hydrocarbon, captured during the first few minutes after engine startup, back to the engine inlet during normal operation of the engine.

The system components preferably include an air pump or pumps driven by the fan belt off the engine crankshaft, manifold air injection piping from an air pump for injection of air into the exhaust ports or manifold of the engine, an overtemperature cooling loop with a bypass pipe and valve, a catalytic converter including a first bed of catalyst capable of reducing nitrogen oxides to nitrogen, carbon dioxide and water vapor by reaction with reducing gas components such as carbon monoxide and hydrogen which are produced in the engine at appropriate air-fuel ratios, air injection ducts to supply oxidizer air from an air pump to a second catalysis bed, the second catalytic bed being capable of oxidizing hydrocarbons and carbon monoxide to water vapor and carbon dioxide with excess air as the oxidizer supplied by an air pump or blower, an absorbent bed capable of absorbing a wide spectrum of hydrocarbons at low temperature, a bypass valve for switching exhaust gas to and from the absorbent bed, an intake to the air filter or intake manifold, to draw a small portion of hot exhaust gas through the hydrocarbon-laden absorbent bed during normal operation of the engine in order to regenerate the absorbent, and temperature controls such as thermo-couple probes in the beds to control the system and exhaust gas flow during various stages of the operating cycle.

The principal advantage of the present invention is that the emission of noxious components in the exhaust gas from an engine is prevented during all stages of the engine operating cycle. The invention converts obnoxious gases such as carbon monoxide, nitrogen oxides, and unburnt hydrocarbons, which are classified by the Federal Government of the United States as major atmospheric pollutants, into harmless non-pollutants, such as water vapor, carbon dioxide and nitrogen. The invention permits the existing highly refined internal combustion engine now used to propel automobiles to remain essentially intact. The control system replaces the exhaust muffler system of the present engines, and with only one moving part, the air pump or blower, the control system removes the pollutants and eliminates obnoxious engine noise and air pollution. The system of the present invention has overcome the problem of cold engine startup which is a condition of high emission for the internal combustion engine and for most other emission control systems. The system of the present invention is simple in its operation, compact in size, low in initial cost and low in maintenance. The system employs catalyst compositions consisting of non-noble metals, which are not classified as pollutants or harmful to life. Novel features of the invention include the control of emissions from the moment the engine is started, even with a cold engine; control of emissions for the entire driving cycle; self-regeneration of the system; a built-in overtemperature control to prevent self-destruction of the system under all load conditions; and ability to tolerate a wide range of engine exhaust gas compositions.

It is an object of the present invention to provide an improved integrated engine exhaust emission control system.

Another object is to prevent air pollution due to the discharge of noxious components in engine exhaust gas into the atmosphere.

A further object is to prevent emission of unburned hydrocarbons during the initial period of operation of a cold engine, when there is a high level of unburned hydrocarbons in the exhaust gas emitted by the engine.

An additional object is to provide an integrated engine exhaust emission control system which functions at a high level of efficiency during all phases of the engine operating cycle.

These and other objects and advantages of the present invention will become evident from the description which follows.

DESCRIPTION OF THE DRAWING AND PREFERRED EMBODIMENTS

Referring now to the drawing, which illustrates the entire integrated engine exhaust emission control system, the system includes engine 1 which is any suitable internal or external combustion engine, which may be stationary or mounted on a moving vehicle such as an automobile, bus or truck. Various other types of engines to which the present invention is applicable are mentioned supra. In this embodiment of the invention, engine 1 is a gasoline-burning internal combustion engine mounted on an automobile chassis. Startup of the engine 1 causes primary combustion air stream 2 to flow into venturi inductor or aspirator 3, which inducts recycle gas stream 4 into the engine during normal operation of the engine, as will appear infra. During startup, only stream 2 flows through unit 3 and stream 2 is drawn into air filter 5. The primary combustion air flows downwards from filter 5 and mixes with fuel stream 6, which may be any suitable fluid hydrocarbon such as gasoline or the like. The resulting combustion mixture flows into the engine intake manifold, not shown, and thereafter into the engine cylinders. Combustion of the fuel in the engine cylinders generates usable power and an exhaust gas stream containing noxious components including nitrogen oxides, hydrocarbons and carbon monoxide. The exhaust gas stream is collected in the exhaust manifolds 7, and during the startup and initial stage of operation of the engine 1, the exhaust gas is discharged into the manifolds 7 with a high concentration of unburned hydrocarbons, typically 0.2 to 3.0 percent by volume as compared to a normal concentration of about 0.1 percent or less, and at a temperature generally below 250° C and typically in the range of 50° to 200° C.

During the initial engine operation stage, a relatively large proportion of secondary air is injected into the exhaust manifolds 7, so that a portion of the hydrocarbons and carbon monixide contained in the exhaust gas are oxidized in situ within the manifolds 7. This oxidation reaction within manifolds 5 produces two desirable results, namely elimination of a portion of the noxious components in the exhaust gas and rapid elevation of the exhaust gas temperature to a suitable level for subsequent catalysis.

Secondary air stream 8 is inducted into and passes through secondary air blower 9, and is discharged as stream 10, which flows through the valve 11 which is fully open during the initial time period of operation of the engine. This initial time period, which commences with engine startup, is generally of a duration of less than 10 minutes and typically of a duration of 2 to 6 minutes. The secondary air flows from open valve 11 via stream 12, which divides into secondary air portion streams 13 and 14, which are passed into the exhaust manifolds 7.

The gaseous mixture of exhaust gas and secondary air formed in manifolds 7 is discharged via streams 15, which are at a temperature generally below 250° C. Streams 15 combine to form stream 16, which flows during the initial startup time period and also during normal operating conditions via stream 17, open valve 18 and stream 19 to stream 20.

During overload operation of engine 1, such as when engine 1 is under a heavy load due to acceleration or movement of the automobile up a steep grade, or other abnormal operating conditions, streams 15 may be discharged at a highly elevated temperature such as in the range of 700° to 1,000° C. In this case, valve 18 is closed and stream 16 flows via stream 21 and open valve 22 into over-temperature control loop 23, which typically consists of a length of pipe preferably provided with a U-bend. Pipe 23 is exposed to the surrounding atmosphere, typically by being mounted below the chassis of the automobile, so that the hot exhaust gas flowing through pipe 23 is cooled by indirect heat exchange with the surrounding atmosphere to a reduced temperature compared to stream 21. Cooling loop 23 discharges the cooled exhaust gas to stream 20.

Stream 20 in any case flows into a bed or plurality of beds of reducing catalyst within container 24. The reducing catalyst within unit 24 is a suitable reducing catalyst for the reduction of nitrogen oxides to innocuous nitrogen by reaction with the remaining hydrocarbon vapors, carbon monoxide and/or hydrogen contained in the exhaust gas component of stream 20. During the initial stage or startup of engine operation, this reaction may not go to completion because of the low temperature of stream 20 and the resultant low temperature of the catalyst in unit 24. In any case, typical catalysts or catalyst formulations for attaining this reduction reaction are nickel, cobalt, manganese or copper, or mixtures thereof, deposited on a suitable carrier such as alumina, kaolin, silica, etc. The active metallic constituents may be present in the catalyst formulation in the metallic state, as oxides or reduced oxides, or as salts. Other suitable or conventional catalysts, such as those specified in the patents and applications enumerated supra, may also be employed in unit 24.

The resulting exhaust gas stream 25 discharged from container 24 is now usually depleted in nitrogen oxides content, however stream 25 contains residual hydrocarbon vapors together with carbon monoxide. During initial operation of the engine 1, stream 25 flows per se directly into the oxidizing catalyst bed, however, during normal operation of the engine 1, and overtemperature operation up to an exhaust gas temperature of about 1,000° C, secondary air is added to stream 25. The secondary air stream 26 in this case passes via blower 27 as stream 28 through open valve 29 and as stream 30 for addition to stream 25 to form stream 31. As mentioned supra, during initial operation of the engine 1, stream 30 is omitted and streams 25 and 31 are identical.

Stream 31 flows into the oxidizing catalyst bed within container 32, which contains discrete particles of an oxidizing catalyst formulation. During initial operation of the engine 1, a minimal reaction may occur in unit 32 due to low temperature. In any case, stream 31 flows into unit 32, and a catalytic oxidation of at least a portion of the hydrocarbon vapors and carbon monoxide in the gas stream to innocuous products such as water vapor and carbon dioxide takes place within container 32. The catalyst bed or beds in unit 32 may be similar or identical to the catalyst bed in unit 24, thus the bed in unit 32 typically consists of oxides or reduced oxides or salts of nickel, cobalt, manganese or copper, or mixtures thereof, or elemental metals deposited on a suitable carrier such as alumina, kaolin, silica or the like. Other suitable catalysts formulations may be employed in unit 32, such as those described in the patents and applications mentioned supra. During normal operation of the engine 1, when stream 30 is added to stream 25 to form stream 31 with a viable oxygen content typically in the range of 1 to 10 percent by volume, an exothermic catalytic reaction takes place in the bed within unit 32 between free oxygen and residual hydrocarbon vapor and/or carbon monoxide, whereby these noxious components derived from the exhaust gas are oxidized to innocuous reaction products. During the initial time period of operation of the engine 1, only partial or incomplete destruction of hydrocarbon vapor takes place in unit 32.

The temperature of the bed within unit 32 is measured by the temperature sensitive element 33, which typically consists of a thermometer, thermo-couple, or a fluid filled bulb within the catalyst bed which transmits fluid pressure or other suitable signal responsive to temperature, to temperature indicating element 34 which is preferably mounted on the dashboard of the automobile. During initial operation of the engine 1, element 34 typically indicates a temperature which is below about 250° C in the bed within unit 32, and element 34 also transmits a signal or control setting via line 35 to relay 36, which electrically or pneumatically transmits a signal to fully open valve 11, to open valve 18 and to close valves 22 and 29. The control signals may also be transmitted via a liquid-filled tube or other hydraulic system. During normal operation of the engine 1, relay 36 transmits a signal to at least partially close valve 11, so that the flow of stream 12 is reduced, and so that during normal operation the free oxygen content of stream 16 is less than about 30 percent in excess of the stoichiometric requirement to oxidize the carbon monoxide content of stream 16. During normal operation of the engine 1, relay 36 also transmits a signal to open valve 29. During elevated temperature operation of engine 1, when the exhaust gas is generated at a temperature typically above 700° C, relay 36 transmits a signal to close valve 18 and open valve 22.

Returning to unit 32, during initial low temperature operation of the engine 1, the catalytically treated exhaust gas stream 37 discharged from unit 32 contains a substantial proportion of residual unoxidized hydrocarbon vapor, which must be recovered to prevent emission to the atmosphere. Stream 37 flows via stream 38, open valve 39 and stream 40 into container 41, which contains one or more beds of a suitable absorbent or adsorbent for hydrocarbon vapors. The hydrocarbon vapors are thus removed from the exhaust gas stream on or within the discrete solid particles of absorbent or adsorbent within unit 41. Any suitable solid material to provide the absorption or adsorption function may be provided within unit 41. Typical usable materials include activated carbon such as charcoal, natural or artificial zeolites, activated alumina, fuller's earth, kaolin, organic resins and the like, which may be employed either singly or in mixtures.

The resulting treated exhaust gas stream 42 discharged downwards from unit 41 during initial engine operation now has a very low or negligible content of residual hydrocarbon vapors, and during the initial interval of engine operation the downflowing stream 42 will be essentially free of hydrocarbon vapors, nitrogen oxides and carbon monoxide. Stream 42 may now be safely discharged downwards to atmosphere via stream 43 without causing air pollution.

During normal engine operation at elevated temperatures typically in the range of 250° to 700° C, valve 39 is closed and downwards flow through unit 41 is terminated. Under these conditions, stream 37 flows via stream 44 and valve 45, which is closed during the initial engine operating period and opened during normal engine operation, when stream 37 is essentially free of noxious components. During normal engine operation, the catalytically treated off-gas thus flows from valve 45 via by-pass line 46, which divides into a minor portion which flows upwards via stream 42 and a major portion which is discharged to atmosphere via stream 43.

The temperature in the absorbent bed within unit 41 is measured by temperature sensing element 47, which may be similar to element 33 described supra. Element 47 transmits a signal to temperature indicating element 48 which is similar to unit 34 described supra. Element 48 transmits a signal to relay 50, which opens valve 39 and closes valve 45 during initial low temperature operation of the engine 1, and closes valve 39 and opens valve 45 during normal temperature operation of the system.

As mentioned supra, during normal operation of the engine 1, stream 46 divides into stream 42 and 43. Stream 42 now flows upwards through the absorbent bed 41, which is now laden with recovered hydrocarbon from prior low temperature operation as described supra. Stream 42 now desorbs hydrocarbon vapor from the absorbent bed within unit 41. The upwards flow rate of stream 42 is now generally less than 20 percent of the overall flow rate of stream 46, and preferably about 5 to 15 percent of the stream 46 flow rate. Previously absorbed or adsorbed hydrocarbon in unit 41 is desorbed into the hot exhaust gas portion stream 42 at a temperature typically in the range of 250° to 700° C. The resulting gaseous mixture of exhaust gas and desorbed hydrocarbon vapor flows from unit 41 via stream 51 and through valve 52, which is opened by relay 50 during normal engine operation, and closed during initial engine operation, so that during normal engine operation stream 51 flows via open valve 52 and stream 4 to the intake appurtenances of engine 1, such as the air filter 5 or the intake manifold, so that the unburned hydrocarbon content of stream 51 is at least partially burned in engine 1 during normal operation of the engine.

Under extreme overload conditions of engine 1 an exhaust gas temperature in excess of 1,000° C may be reached. Under these circumstances, relay 36 will close both valves 11 and 29 and completely terminate secondary air flow. In addition, relay 50 will close valve 52, so as to terminate upwards flow of stream 42 and thereby prevent overheating and damage to the hydrocarbon absorbent bed within unit 41. It will be apparent to those skilled in the art that the functions of relay 50 may be carried out in some instances by relay 36, in which case units 47, 48, and 50 may be omitted. Temperature sensitive and control elements may be provided at other or alternate places in the system in suitable instances, to accomplish the control functions described supra.

Numerous alternatives within the scope of the present invention, besides those alternatives mentioned supra, will occur to those skilled in the art. Secondary air streams 10 and 28 may be provided by a single secondary air blower, and in any case the secondary air blowers will be provided with appropriate pressure valves or the like. The temperature-responsive control systems described supra may be replaced by suitable functionally equivalent devices or equipment in suitable instances. Thus, the operation may alternatively be controlled by time cycle relays or the like, so that valve 11 is fully open and valve 29 is closed during the first 10 minutes or so after startup of a cold engine, or during the first 2 to 6 minutes after startup when ambient temperatures are normal or relatively high. Then, after this initial time period, typically 4 minutes in duration, the valve settings would be changed by a time control relay initially activated by the starter circuit or the like, to automatically open valve 29 and to partially or totally close valve 11. The temperature ranges and other limitations enumerated supra may vary, depending on the type of engine, the nature of the fuel, the nature or type of catalyst employed in units 24 and/or 32, and the nature of the hydrocarbon absorbent employed in unit 41. Thus, some absorbents such as activated carbon are adversely affected by elevated temperature, and when such absorbents are employed in unit 41, the valve 52 may be closed at relatively lower temperatures such as 600° C. In some instances, such as described in U.S. Patent Application No. 33,359 filed Apr. 30, 1970, now U.S. Pat. No. 3,656,915, the reducing and oxidizing catalyst beds will be integrally combined into a single device such as a catalytic muffler, and the same catalytic agent, known as a redox catalyst because of ability to catalyze both reducing and oxidizing reactions, may be employed in both catalyst beds. The temperature sensing element 33 may measure exhaust gas temperature prior to the oxidizing catalyst bed. In any alternative of this nature, the operating parameter of exhaust gas temperature is measured so as to control the settings of the valves 11, 18, 22, 29, 39, 45 and/or 52. In some instances, valve 52 may be open during the initial engine operating period.

An example of the application of the method of the present invention to an automobile engine will now be described.

Example

The present system was applied to a 350 cu. in. Oldsmobile 1971 Model engine. The internal combustion engine tested had the following parameters:

| | |
|---|---|
| Displacement | 350 cu. in. |
| Compression Ratio | 8.1/1 |
| Air Fuel Ratio at 30 mph | 14.2 |
| Ignition Timing at 1100 RPM | 10° BTC |
| Fuel | Indolene |
| Engine Type | V8 |
| Automatic Transmission | Spark Control |

The engine was started in accordance with the normal manufacturer's recommended procedure.

TABLE I.—COLD ENGINE STARTUP—FIRST TIME PERIOD

| Stream No. | Flow rate,* c.f.m. | Temp., °C. | Engine speed, m.p.h. | Concentration in vol. percent | | |
|---|---|---|---|---|---|---|
| | | | | Hydrocarbons as hexane | CO | NO$_x$ |
| 12 | 12 | Ambient | Idle | | | |
| 16 | 20 | 420 | Idle | 0.10 | 1.5 | 0.15 |
| 25 | | 260 | Idle | | | |
| 30 | 0 | | | | | |
| 40 | 20 | 150 | Idle | 0.075 | 0.6 | |
| 43 | 20 | 66 | Idle | 0.015 | 0.6 | |

* At 20° C., 1 atm.

TABLE II.—NORMAL ENGINE OPERATION—SECOND TIME PERIOD

| Stream No. | Flow rate, c.f.m. | Temp., °C. | Engine speed, m.p.h. | Concentration in vol. percent | | |
|---|---|---|---|---|---|---|
| | | | | Hydrocarbons as hexane | CO | NO$_x$ |
| 12 | 1.5 | Ambient | 30 | | | |
| 16 | 32 | 510 | 30 | 0.09 | 2.8 | |
| 25 | 32 | 650 | 30 | | | |
| 30 | 6 | Ambient | | | | |
| 31 | 38 | | | | | |
| 44 | 38 | 530 | 30 | 0.015 | 0.1 | 0.005 |
| 51 | 3.5 | 150 | 30 | 0.025 | 0.1 | 0.005 |

TABLE III.—OVERLOAD ENGINE OPERATION—THIRD TIME PERIOD

| Stream No. | Flow rate, c.f.m. | Temp., °C. | Engine speed, m.p.h. | Concentration in vol. percent | | |
|---|---|---|---|---|---|---|
| | | | | Hydrocarbons as hexane | CO | NO$_x$ |
| 12 | 0 | | | | | |
| 16 | 30.5 | 550 | 30 | | | |
| 20 | 30.5 | 350 | 30 | | | |
| 30 | 6 | Ambient | | | | |
| 31 | 36.5 | | | | | |
| 44 | 36.5 | 530 | 30 | 0.015 | 0.0 | 0.005 |
| 51 | 3.5 | 150 | 30 | 0.025 | 0.0 | 0.005 |

TABLE IV.—HIGH OVERLOAD ENGINE OPERATION—FOURTH TIME PERIOD

| Stream No. | Flow rate, c.f.m. | Temp., °C. | Engine speed, m.p.h. | Concentration in vol. percent | | |
|---|---|---|---|---|---|---|
| | | | | Hydrocarbons as hexane | CO | NO$_x$ |
| 12 | 0 | | | | | |
| 16 | 30.5 | 550 | 30 | | | |
| 20 | 30.5 | 350 | 30 | | | |
| 30 | 0 | | | | | |
| 44 | 30.5 | 530 | 30 | 0.015 | 0.0 | .005 |
| 42 | 0 | | | | | |

We claim:

1. In a method for controlling engine exhaust emissions in which the initial exhaust gas stream emitted by the engine contains noxious impurities including nitrogen oxides, hydrocarbons and carbon monoxide, said initial exhaust gas stream is passed through a reducing catalyst bed for the catalytic reduction of nitrogen oxides to nitrogen, the intermediate exhaust gas stream discharged from said reducing catalyst bed is passed through an oxidizing catalyst bed for the catalytic oxidation of at least a portion of said hydrocarbons and carbon monoxide to innocuous oxidation products, secondary air being added to said exhaust gas stream prior to passing the exhaust gas stream through said oxidizing catalyst bed, and a resulting catalytically treated exhaust gas stream is discharged from said oxidizing catalyst bed, the improvement during successive time periods of operation of said engine after startup which comprises a. operating said engine during a first time period, said first time period commencing with engine startup and extending for a duration of up to about 10 minutes, said initial exhaust gas stream being emitted at a temperature below 250° C and containing an abnormally high concentration of hydrocarbon vapor during said first time period, b. injecting a first stream of secondary air into said initial exhaust gas stream during said first time period, said first stream of secondary air being injected prior to passing said initial exhaust gas stream through said reducing catalyst bed, c. contacting said resulting catalytically treated exhaust gas stream with a solid absorbent bed during said first time period, whereby residual hydrocarbon vapor in said resulting exhaust gas stream is absorbed by said solid absorbent bed and a final exhaust gas stream substantially free of hydrocarbon vapor is discharged from said solid absorbent bed, d. operating said engine under normal operating conditions during a second time period after the termination of said first time period, said initial exhaust gas stream being emitted from said engine at a temperature in the range of 250° to 700° C during said second time period, e. reducing the flow rate of said first stream of secondary air during said second time period, whereby the free oxygen content of said initial exhaust gas stream at entry into said reducing catalyst bed is less than about 30 percent in excess of the stoichiometric requirement to oxidize carbon monoxide contained in said initial exhaust gas stream, f. injecting a second stream of secondary air into said intermediate exhaust gas stream during said second time period, said second stream of secondary air being injected prior to passing said intermediate exhaust gas stream through said oxidizing catalyst bed, whereby substantially all of the hydrocarbon vapor and carbon monoxide in said exhaust gas stream are catalytically oxidized in said oxidizing catalyst bed during said second time period, g. dividing the resulting catalytically treated exhaust gas stream discharged from said oxidizing catalyst bed during said second time period into a major portion and a minor portion, h. discharging said major portion of said resulting catalytically treated exhaust gas stream to atmosphere during said second time period, discharged from said absorbent bed i. passing said minor portion of said resulting catalytically treated exhaust gas stream through said absorbent bed during said second time period, whereby hydrocarbon previously absorbed during said first time period is desorbed and a mixed gaseous stream containing desorbed hydrocarbon vapor and exhaust gas is discharged from said absorbent bed during said second time period, and j. passing said mixed gaseous stream formed by step (i) into said engine during said second time period, whereby at least a portion of the desorbed hydrocarbon vapor in said mixed gaseous stream is burned in said engine.

2. The method of claim 1, in which said engine is an internal combustion engine.

3. The method of claim 2, in which said internal combustion engine is an automobile engine.

4. The method of claim 1, in which said reducing catalyst bed and said oxidizing catalyst bed contain an active catalytic agent selected from the group consisting of nickel, cobalt, copper and manganese, and mixtures thereof, deposited on a carrier.

5. The method of claim 1, in which said solid absorbent bed contains an active hydrocarbon adsorbent selected from the group consisting of activated carbon, zeolite, activated alumina, fuller's earth, kaolin, and organic resin, and mixtures thereof.

6. The method of claim 1, in which said secondary air stream is injected into said initial exhaust gas stream according to step (b) by injecting said secondary air stream into the exhaust manifold of said engine.

7. The method of claim 1, in which the duration of said firt time period is in the range of about 2 to 6 minutes.

8. In a method for controlling engine exhaust emissions in which the initial exhaust gas stream emitted by the engine contains noxious impurities including nitrogen oxides, hydrocarbons and carbon monoxide, said initial exhaust gas stream is passed through a reducing catalyst bed for the catalytic reduction of nitrogen oxides to nitrogen, the intermediate exhaust gas stream discharged from said reducing catalyst bed is passed through an oxidizing catalyst bed for the catalytic oxidation of at least a portion of said hydrocarbons and carbon monoxide to innocuous oxidation products, secondary air being added to said exhaust gas stream prior to passing the exhaust gas stream through said oxidizing catalyst bed, and a resulting catalytically treated exhaust gas stream is discharged from said oxidizing catalyst bed, the improvement during successive time periods of operation of said engine including operation at an abnormally high temperature which comprises
  a. operating said engine under normal operating conditions, whereby said initial exhaust gas stream is emitted from said engine at a normal operating temperature in the range of 250° to 700° C,
  b. injecting a first stream of secondary air into said initial exhaust gas stream under normal operating conditions, said first stream of secondary air being injected prior to passing said initial exhaust gas stream through said reducing catalyst bed, whereby the free oxygen content of said initial exhaust gas stream at entry into said reducing catalyst bed is less than about 30 percent in excess of the stoichiometric requirement to oxidize carbon monoxide contained in said initial exhaust gas stream,
  c. injecting a second stream of secondary air into said intermediate exhaust gas stream under normal operating conditions, said second stream of secondary air being injected prior to passing said intermediate exhaust gas stream through said oxidizing catalyst bed, whereby substantially all of the hydrocarbon vapor and carbon monoxide in said exhaust gas stream are catalytically oxidized in said oxidizing catalyst bed under normal operating conditions,
  d. operating said engine under abnormal operating conditions during a first time period after normal operation of said engine, whereby said initial exhaust gas stream is emitted from said engine at a temperature in the range of 700° to 1,000° C during said first time period,
  e. cooling said initial exhaust gas stream by indirect heat exchange with the surrounding atmosphere during said first time period, by passing said initial exhaust gas stream through means adapted to receive and cool exhaust gas during said first time period,
  f. maintaining steps (b) and (c) during said first time period,
  g. operating said engine under abnormal operating conditions during a second time period after the termination of said first time period, whereby said initial exhaust gas stream is emitted from said engine at a temperature above 1,000° C during said second time period, and
  h. terminating the flow of said first and second streams of secondary air during said second time period.

9. The method of claim 8, in which said engine is an internal combustion engine.

10. The method of claim 9, in which said internal combustion engine is an automobile engine.

11. The method of claim 8, in which said reducing catalyst bed and said oxidizing catalyst bed contain an active catalytic agent selected from the group consisting of nickel, cobalt, copper and manganese, and mixtures thereof, deposited on a carrier.

12. The method of claim 8, in which said first stream of secondary air is injected into said initial exhaust gas stream according to step (b) by injecting said secondary air stream into the exhaust manifold of said engine.

13. In a method for controlling engine exhaust emissions in which the initial exhaust gas stream emitted by the engine contains noxious impurities including nitrogen oxides, hydrocarbons and carbon monoxide, said initial exhaust gas stream is passed through a reducing catalyst bed for the catalytic reduction of nitrogen oxides to nitrogen, the intermediate exhaust gas stream discharged from said reducing catalyst bed is passed through an oxidizing catalyst bed for the catalytic oxidation of at least a portion of said hydrocarbons and carbon monoxide to innocuous oxidation products, secondary air being added to said exhaust gas stream prior to passing the exhaust gas stream through said oxidizing catalyst bed, and a resulting catalytically treated exhaust gas stream is discharged from said oxidizing catalyst bed, the improvement during successive time periods of operation of said engine after startup which comprises
  a. operating said engine during a first time period, said first time period commencing with engine startup and extending for a duration of up to about 10 minutes, said initial exhaust gas stream being emitted at a temperature below 250° C and containing an abnormally high concentration of hydrocarbon vapor during said first time period,
  b. injecting a first stream of secondary air into said initial exhaust gas stream during said first time period, said first stream of secondary air being injected prior to passing said initial exhaust gas stream through said reducing catalyst bed,
  c. contacting said resulting catalytically treated exhaust gas stream with a solid absorbent bed during said first time period, whereby residual hydrocarbon vapor in said resulting exhaust gas stream is absorbed by said solid absorbent bed and final exhaust gas stream substantially free of hydrocarbon vapor is discharged from said solid absorbent bed, d. operating said engine under normal operating conditions during a second time period after the termination of said first time period, said initial exhaust gas stream being emitted from said engine at a temperature in the range of 250° to 700° C during said second time period, e. reducing the flow rate of said first stream of secondary air during said second time period, whereby the free oxygen content of said initial exhaust gas stream at entry into said reducing catalyst bed is less than about 30 percent in excess of the stoichiometric requirement to oxidize carbon monoxide contained in said initial exhaust gas stream, f. injecting a second stream of secondary air into said intermediate gas stream during said second time period, said second stream of secondary air being injected prior to passing said intermediate exhaust gas stream through said oxidizing catalyst bed, whereby substantially all of the hydrocarbon vapor and carbon monoxide in said exhaust gas stream are catalytically oxidized in said oxidizing catalyst bed during said second time period, g. dividing the resulting catalytically treated exhaust gas stream discharged from said oxidizing catalyst bed during said second time period into a major portion and a minor portion, h. discharging said major portion of said resulting catalytically treated exhaust gas stream to atmosphere during said second time period, i. passing said minor portion of said resulting catalytically treated exhaust gas stream through said absorbent bed during said second time period, whereby hydrocarbon previously absorbed during said first time period is desorbed and a mixed gaseous stream containing desorbed hydrocarbon vapor and exhaust gas is discharged from said absorbent bed during said second time period, j. passing said mixed gaseous stream formed by step (i) into said engine during said second time period, whereby at least a portion of the desorbed hydrocarbon vapor in said mixed gaseous stream is burned in said engine, k. operating said engine under abnormal operating conditions during a third time period after the termination of said second time period, whereby said initial exhaust gas stream is emitted from said engine at a temperature in the range of 700° to 1,000° C during said third time period, l. cooling said initial exhaust gas stream by indirect heat exchange with the surrounding atmosphere during said third time period, by passing said initial exhaust gas stream through means adapted to receive and cool exhaust gas during said third time period, m. maintaining steps (e), (f), (g), (h), (i) and (j) during said third time period, n. operating said engine under abnormal operating conditions during a fourth time period after the termination of said third time period, whereby said initial exhaust gas stream is emitted from said engine at a temperature above 1,000° C during said fourth time period, o. terminating the flow of said first and second streams of secondary air during said fourth time period, and p. terminating the flow of said minor portion of said resulting catalytically treated exhaust gas stream through said absorbent bed during said fourth time period, and thereby terminating the flow of said mixed gaseous stream into said engine during said fourth time period.

14. The method of claim 13, in which said engine is an internal combustion engine.

15. The method of claim 14, in which said internal combustion engine is an automobile engine.

16. The method of claim 13, in which said reducing catalyst bed and said oxidizing catalyst bed contain an active catalytic agent selected from the group consisting of nickel, cobalt, copper and manganese, and mixtures thereof, deposited on a carrier.

17. The method of claim 13, in which said solid absorbent bed contains an active hydrocarbon absorbent selected from the group consisting of activated carbon, zeolite, activated alumina, fuller's earth, kaolin, and organic resin, and mixtures thereof.

18. The method of claim 13, in which said first stream of secondary air is injected into said initial exhaust gas stream according to step (b) by injecting said secondary air stream into the exhaust manifold of said engine.

19. The method of claim 13, in which the duration of said first time period is in the range of about 2 to 6 minutes.

20. The method of claim 13, in which the flow of said first stream of secondary air is terminated during said second time period.

* * * * *

UNITED STATES PATENT OFFICE
CERTIFICATE OF CORRECTION

Patent No. 3,757,521   Dated September 11, 1973

Inventor(s) John F. Tourtellotte et al

It is certified that error appears in the above-identified patent and that said Letters Patent are hereby corrected as shown below:

Claim 1 step (h) at col. 10 lines 54-55, delete "discharged from said absorbent bed". Also step (i) at col. 10 lines 62-63, delete "dischargedfrom saidasorb-ent bPd" and read "discharged from said absorbent bed".

Claim 5 line 2 at col. 11 line 11, delete "adsorbent" and read "absorbent".

Claim 13 step (f), after the first "intermediate" at col. 13 line 18, read "exhaust".

Signed and sealed this 18th day of December 1973.

(SEAL)
Attest:

EDWARD M. FLETCHER, JR.          RENE D. TEGTMEYER
Attesting Officer                 Acting Commissioner of Patents